United States Patent [19]

Tipton et al.

[11] 4,374,106

[45] Feb. 15, 1983

[54] PROCESS FOR REDUCING THE HYDROGEN SULFIDE CONTENT IN GEOTHERMAL STEAM

[75] Inventors: Ann B. Tipton, Diamond Bar; Alan C. Crosby, Tustin, both of Calif.

[73] Assignee: Occidental Research Corporation, Irvine, Calif.

[21] Appl. No.: 373,317

[22] Filed: Apr. 30, 1982

Related U.S. Application Data

[63] Continuation of Ser. No. 294,631, Aug. 20, 1981, abandoned.

[51] Int. Cl.$^3$ .............................................. B01D 53/34
[52] U.S. Cl. ................................... 423/231; 423/224; 423/DIG. 19; 60/641.2
[58] Field of Search ....... 423/230, 231, 224, DIG. 19; 60/641.2

[56] References Cited

U.S. PATENT DOCUMENTS 2,083,894 6/1937 Connolly .............................. 423/224
4,088,743 5/1978 Hass et al. ........................ 423/230 X
4,196,183 4/1980 Li ......................................... 423/230
4,259,300 3/1981 Lieffers ........................... 423/230 X

OTHER PUBLICATIONS

Kohl, Arthur L. & Riesenfeld, Fred C., "Gas Purification", Third Edition, Gulf Publishing Co., pp. 380-402.
Duckworth, G. L. & Geddes, J. H., "Natural Gas Desulfurized by the Iron-Sponge Process", Oil and Gas Journal, Sep. 13, 1965.
Taylor, D. H., "Iron-Sponge Desulfurization Gains Popularity", Oil and Gas Journal, Nov. 5, 19 and Dec. 3, 10, 1956.
Taylor, D. H., "Small-Diameter Towers Used for Purifiers", Oil and Gas Journal, Nov. 5, 19, Dec. 3, 10, 1956.
Taylor, D. H., "Using the Recirculation Method of Revivification", Oil and Gas Journal, Nov. 5, 19, Dec. 3, 10, 1956.
Taylor, D. H., How to Desulfurize Natural Gas-1", Oil and Gas Journal, Nov. 5, 19, Dec. 3, 10, 1956.
Johnson, G. E. Field, J. H., and Decker, W. A., "Removing Hydrogen Sulfide from Synthesis Gas with Iron Oxide at Elevated Pressure", United States Department of the Interior, Bureau of Mines.
Kethman, H. C., Connelly-GPM, Inc. letter dated Sep. 10, 1976.
Keller, T. P., "Some Modern Developments in Dry-Box Purification", Gas-Meters Association of Florida and Georgia, Gainsville, Florida, Nov. 7, 1941.
Stafford, R. W., "Iron Sponge as an Aid to Sewage Gas Engine Operation".
Handbook of Gasifiers and Gas Treatment Systems, Feb., 1976, Dravo Corporation, pp. 154-156.
Consultant Report, Stanford Research Institute for California Energy Resources Conservation and Development Commission, May, 1977, pp. D-1-D-8.

Primary Examiner—Earl C. Thomas
Attorney, Agent, or Firm—Walter A. Hackler

[57] ABSTRACT

A process for removing hydrogen sulfide from geothermal steam utilizes iron oxide supported by a carrier resistant to deterioration by the geothermal steam. The process includes the addition of an oxygen-containing gas to the geothermal steam before contacting the steam with the iron oxide at a temperature of at least about 300° F. The amount of oxygen added to the geothermal steam is sufficient to make the molar ratio of oxygen-to-hydrogen sulfide in the steam to be at least about 10.

17 Claims, 1 Drawing Figure

PROCESS FOR REDUCING THE HYDROGEN SULFIDE CONTENT IN GEOTHERMAL STEAM

This is a continuation of application Ser. No. 294,631, filed Aug. 20, 1981, and now abandoned.

BACKGROUND OF THE INVENTION

The present invention relates generally to the purification of steam produced by geothermal sources and more particularly to a process to reduce the hydrogen sulfide content of the steam.

Geothermal steam has been used for power generation for many years and current deminishing hydrocarbon fuel reserves provide a motive for increasing the utilization of such alternate energy sources.

In general, steam recovered from underground geothermal sources includes, water, carbon dioxide, hydrogen sulfide as well as other contaminating gases. In many cases the hydrogen sulfide content of the steam is sufficiently high to make discharge of the steam into the air environmentally unacceptable. Release of the geothermal steam may occur during the drilling of a geothermal well, during the utilization of the geothermal steam in power plants, or during bleeding of geothermal wells to the atmosphere.

The removal of hydrogen sulfide from gases has been accomplished by many well known processes. For example, it is well known to remove hydrogen sulfide from gaseous stream by contacting the gas with an aqueous alkaline solution of hydrogen peroxide. However, economic considerations concerning this system may prevent full scale commercial utilization of the process.

Another known method to remove hydrogen sulfide from gases is to contact the gas with activated carbon to catalyze the oxidation of hydrogen sulfide to elemental sulfur and water. In addition, many other methods including the iron sponge process have been used to reduce the hydrogen sulfide content therein. In the latter process the gas containing hydrogen sulfide is removed by the adsorption reaction of the hydrogen sulfide with a hydrated ferric oxide as shown in the chemical reaction:

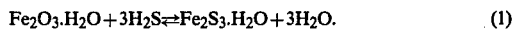

$$Fe_2O_3 \cdot H_2O + 3H_2S \rightleftharpoons Fe_2S_3 \cdot H_2O + 3H_2O. \tag{1}$$

After a period of time, the bed becomes ineffective in adsorbing any more hydrogen sulfide because the hydrated ferric oxide is no longer available for reaction. At this time the iron oxide is regenerated by passing air through the bed at ambient conditions to produce elemental sulfur as shown in the chemical equation:

$$Fe_2S_3 \cdot H_2O + 3O_2 \rightleftharpoons Fe_2O_3 \cdot H_2O + 3S_2. \tag{2}$$

As the iron sponge is regenerated over and over, sulfur coats the sponge and eventually forces the replacement of the sulfur coated iron sponge with fresh material.

While the use of ferric oxide has been used for reducing the hydrogen sulfide content of dry gases such as natural gas and manufactured gas or the like, which have low moisture content, the use of ferric oxide has been considered an impractical method for reducing the hydrogen sulfide content in geothermal steam because of the high water content therein.

Since the ferric oxide method has as a reaction product, water, the presence of water in the steam may impede and slow down the reaction by which hydrogen sulfide is removed. That is, with reference to equation (1) between ferric oxide and hydrogen sulfide, an equilibrium condition is reached earlier because of the presence of water in the steam thereby reducing the effectiveness and the amount of hydrogen sulfide that can be removed from the steam.

In other terms, the presence of water in the steam may promote the reverse reaction:

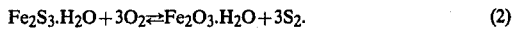

$$Fe_2S_3 + 3H_2O \rightarrow Fe_2O_3 + 3H_2S \tag{3}$$

Thus, there may be a competing reaction, when water is present in the gas or steam, that regenerates hydrogen sulfide thereby making the use of ferric oxide or activated carbon impractical or ineffective in removing hydrogen sulfide. This regeneration of hydrogen sulfide may be enhanced at higher temperatures as it is well known that the iron sponge process is effective in the temperature range of approximately 100° F., with the reaction rate of $Fe_2S_3 \cdot H_2O$ formation (see equation (1)) dropping off at higher temperatures.

A further disadvantage of the conventional iron sponge process is the time needed to regenerate the reaction bed by passing air or oxygen therethrough. Prior art has taught the passing of an oxygen containing hydrogen sulfide to react with the $Fe_2S_3$ to form $Fe_2O_3$ but this has only been attempted with dry gases. Further, as hereinabove noted, the iron sponge process is effective only in the temperature range of approximately 100° F. Hence, the process has not been considered as practical for removing the hydrogen sulfide from geothermal steams having temperatures of 300° F., or above.

SUMMARY OF THE INVENTION

In accordance with the present invention the process for removing hydrogen sulfide from geothermal steam includes the steps of introducing an oxygen-containing gas into steam produced by a geothermal source, and contacting the steam and oxygen containing gas in a contacting stage with iron oxide supported by a carrier resistant to deterioration by said steam at conditions sufficient to remove hydrogen sulfide from said steam and oxygen containing gas. The steam has a temperature of at least about 300° F., and the oxygen-containing gas is introduced into said steam in an amount to cause a molar ratio of oxygen to hydrogen sulfide in the steam and oxygen containing gas to be at least about 10.

BRIEF DESCRIPTION OF THE DRAWING

The invention will be more readily understood by reference to the accompanying drawing in which.

DETAILED DESCRIPTION

Figure 1:
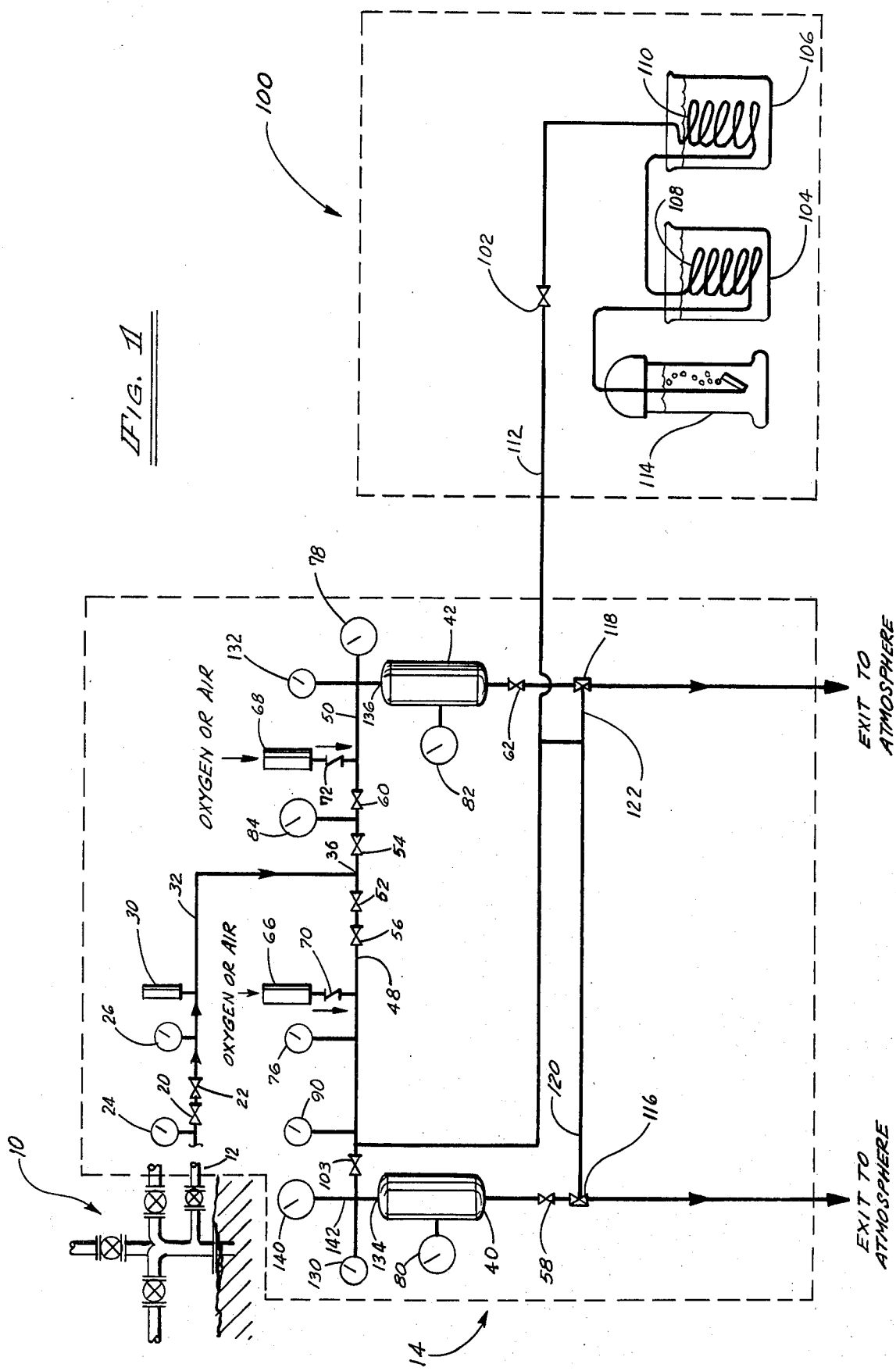
FIG. 1 is a schematic flow diagram of the hydrogen sulfide removal process of the present invention showing two reactors for separately removing hydrogen sulfide from the geothermal steam under varying conditions of pressure, steam and air or oxygen flow rates.

Referring to FIG. 1, the geothermal steam from a geothermal well head 10 may be introduced by a conduit 12 to the reactor system 14 for reducing the hydrogen sulfide content to the geothermal steam. Although FIG. 1 shows the geothermal steam being drawn directly from the well head, it should be appreciated that such steam may be drawn from other locations in an on site power plant designed to produce power from geothermal steam.

The pressure of the geothermal steam is regulated by a ball valve 20 and a needle value 22, with the geothermal steam well head pressure being monitored by a pressure gauge 24 and the regulated pressure steam being monitored by a pressure gauge 26. A safety relief valve 30 may be provided in the pressurized line 32 to provide releasing of the geothermal steam into the atmosphere if the pressure exceeds a predetermined value, for example which may be approximately 150 psig.

A tee 36 is provided in the line 32 to enable both a 3" reactor 40 and a 6" reactor 42 to be operated independently or simultaneously via steam lines 48 and 50.

It should be appreciated that the reactors 40, 42 shown are sized to investigate the operating parameters of the process of the present invention and that larger reactors may be necessary to reduce the hydrogen sulfide content in a commercial geothermal application. The reactor size may be determined by conventional scaling factors based in part on the volume of steam and the hydrogen sulfide content.

As illustrated in FIG. 1, shutoff valves 52 and 54 enable independent and simultaneous operation of the 3" and 6" reactor, 40 and 42 respectively, while needle valves 56 and 58 provide a means for a final adjustment of the pressure and steam flow rate through the 3" reactor 40. Similarly, needle valves 60 and 62 provide means for final adjustment of the pressure and steam flow rate through the 6" reactor 42.

As will be hereinafter discussed in greater detail in connection with the example, oxygen or air is introduced to the 3" reactor 40 and 6" reactor 42 via the lines 48 and 50 respectively, through flow meters 66 and 68 and check valves 70 and 72 respectively, said check valves being provided to prevent backward flow of the steam into the oxygen or air source, (not shown). Temperature gauges 76 and 78 measure the temperature of the geothermal steam and oxygen mixture entering the 3" and 6" reactor 40 and 42, respectively.

Thermocouples (not shown) and meters 80 and 82 are provided to measure the outside skin temperature of the 3" and 6" reactor 40 and 42, respectively, while a thermocouple (not shown) and a meter 84 is provided for measuring the outside temperature of the line 50 in order to monitor the heat loss from the lines as well as from the surface of the reactors. A pressure gauge 90 and the temperature gauge 76 provide pressure and temperature measurements for the steam entering the sampling system 100 which includes a sampling valve 102 and two steam condensers 104, 106 including coils 108, 110 interconnecting a sampling line 112 with a sample collection bottle 114.

As shown in FIG. 1, the sampling system 100 is interconnected with the output of the 3" and 6" reactors 40, 42, by means of three way valves 116, 118 and lines 120, 122, respectively.

Pressure gauges 130, 132 are positioned near the entrances 134, 136 of the 3" and 6" reactor 40, 42, respectively, to accurately measure the pressure of the geothermal steam and air/oxygen mixture as it enters the respective reactors. A thermocouple (not shown) having a meter 140 attached thereto and inserted into the 3" reactor 42 via the inlet line 142 is provided to measure the internal temperature of the reactor 40.

The 3" and 6" reactor 40, 42, respectively, as well as the entire system for removing hydrogen sulfide from geothermal steam is designed to be operable at up to pressures of approximately 150 psi and at temperatures exceeding 300° F. Both the 3" diameter and the 6" diameter reactors 40, 42 are filled with an iron oxide which is coated on a carrier suitable for withstanding steam and water at the operating temperature without deterioration thereof. Pumice may be suitable for this carrier, but other carriers which may absorb water and expand or crumble are not desirable.

In operation, geothermal steam is bled from the well head 10 and the pressure thereof regulated as will be hereinafter described in the example. The temperature of the steam is typically in excess of 300° F. A controlled amount of oxygen or air is allowed to enter the geothermal steam via flow meter 66, 68 respectively, with the pressure and temperature of the mixture monitored as indicated by the pressure and temperature gauges hereinbefore described. The gas mixture is passed through the reactors 40, 42 and thereafter discharged into the atmosphere or reinjected into the geothermal reservoir. Periodic sampling of the steam and oxygen mixture is done via the sampling valve 102 and periodic sampling of the geothermal steam having reduced hydrogen sulfide content is periodically monitored and set to the sampling system 100 via the valves 116 and 118.

A sampling collection procedure includes cooling of the steam to form a condensate thereof by the steam condensers 104 and 106 and thereafter bubbling the condensate through ammonium hydroxide to dissolve the hydrogen sulfide in the condensate in the sample collection bottle 114.

Thereafter, the samples are analyzed for hydrogen sulfide concentration by $AgNO_3$ titration with a potentiometeric determination of the end point. The hydrogen sulfide concentrations in parts per million by weight (ppmw) and steam flow rates in pounds per hour are disclosed in the following examples.

The following example is provided for illustrative purposes of showing the process of the present invention in reducing the amount of hydrogen sulfide in geothermal steam.

EXAMPLE

Geothermal steam from Geysers in Lake County California was introduced to the test apparatus schematically shown in FIG. 1. The three inch and six inch reactors were operated under conditions as shown in Tables 1, 2, 3 and 4. Each of the reactors contained approximately 2½ lbs. (1135 gms) of iron coated pumice of which approximately 30% is described as iron oxyhydroxide FeO(OH). Such material is commercially available from Connelly-GPM, Inc. of Chicago, Illinois.

The geothermal steam had a varying hydrogen sulfide concentration of approximately 65 to 160 parts per million by weight (ppmw) with a mean concentration of approximately 100 ppmw. In addition the geothermal steam included approximately 600 ppmw of $CO_2$, 40 ppmw of $NH_3$ as well as small amounts of nitrogen, hydrogen and methane in the non-condensible gas phase.

Air or oxygen was introduced into the geothermal steam at a rate causing the molar ratio of oxygen-to-hydrogen sulfide in the steam-oxygen mixture to be approximately 10 or greater. It was found that with $O_2$-to-$H_2S$ molar ratios less than about 10, the amount of $H_2S$ removed from the geothermal steam was significantly less.

Tables 1 and 2 show the average operating conditions for the three and six inch reactor using cylinder oxygen and Tables 3 and 4 show the average operating conditions for the three and six inch reactor using air as an oxygen-containing gas.

Flow rates averaging approximately 22 lbs/hr and 12 lbs/hr of geothermal steam were established through the six and three inch reactors respectively and samples of steam entering and leaving the reactors were taken over the run duration. The superficial velocity as well as the weight hour space velocity (WHSV) and volume hour space velocity (VHSC) of the steam through the reactors is given in Tables 1, 2, 3, and 4.

The removal of hydrogen sulfide as a function of time as determined by the silver nitrate titration method hereinbefore noted, is given in Table 5 for the runs shown in Tables 3 and 4. It can be observed that during an initial period of operation up to 261 hours, the efficiency of hydrogen sulfide removal first declined and then increased. It is believed this may be due, in part, to the conversion of the iron oxyhydroxide to ferric oxide. This was verified by Mossbauer spectra analysis of the spent catalyst.

Analysis of the spent catalyst has also shown no elemental sulfur, hence, the iron oxyhydroxide and ferric oxide are not reacting in accordance with the teachings of the prior art iron sponge process which, at lower temperatures, produces such elemental sulfur. It is believed therefore that the iron oxyhydroxide and ferric oxide act as catalysts in removing hydrogen sulfide from the geothermal steam.

TABLE 1

Average Operating Conditions

| Parameter | Three Inch Reactor | |
|---|---|---|
| | Average | Range |
| Catalyst Weight (lb) | 2.5 | |
| Steam Rate (lb/hr) | 12.3 | 7.3–25.1 |
| Inlet $H_2S$ (ppmw) | 106.8 | 67.–217. |
| Removal (%) | 87.7 | 18.–100. |
| Pressure (PSIG) | 94. | 53.–124. |
| Temperature (°F.) | 331. | 290.–350. |
| Contact Time (sec) | 3.3 | 1.4–5.5 |
| Superficial Velocity (cm/sec) | 8.9 | 4.8–18.4 |
| WHSV ($hr^{-1}$) | 4.9 | 2.9–10.0 |
| VHSV ($hr^{-1}$) | 1200. | 650.–2800. |
| $O_2:H_2S$ Ratio | 140. | 0.–350. |
| Duration of run (hours) | 2285 | |

TABLE 2

Average Operating Conditions

| Parameter | Six Inch Reactor | |
|---|---|---|
| | Average | Range |
| Catalyst Weight (lb) | 2.5 | |
| Steam Rate (lb/hr) | 22.1 | 5.4–36.0 |
| Inlet $H_2S$ (ppmw) | 98.5 | 64.–217. |
| Removal (%) | 67.5 | 6.9–100. |
| Pressure (PSIG) | 100. | 50.–126. |
| Temperature (°F.) | 336. | 290.–350. |
| Contact Time (sec) | 2.0 | 0.9–8.3 |
| Superficial Velocity (cm/sec) | 3.8 | 0.8–7.1 |
| WHSV ($hr^{-1}$) | 8.8 | 2.2–14.4 |
| VHSV ($hr^{-1}$) | 2100. | 430.–3900. |
| $O_2:H_2S$ Ratio | 240. | 0.–900. |
| Duration of run (hours) | 2493 | |

TABLE 3

Average Operating Conditions

| Parameter | Three Inch Reactor | |
|---|---|---|
| | Average | Range |
| Catalyst Weight (lb) | 2.5 | |
| Steam Rate (lb/hr) | 14.4 | 6.2–43.5 |
| Inlet $H_2S$ (ppmw) | 97.7 | 69.–115. |
| Removal (%) | 82.1 | 15.2–100. |
| Pressure (PSIG) | 94. | 75.–114. |
| Temperature (°F.) | 331. | 300.–350. |
| Contact Time (sec) | 3.3 | 1.0–6.3 |
| Superficial Velocity (cm/sec) | 10.2 | 4.2–26.3 |
| WHSV ($hr^{-1}$) | 5.7 | 2.5–17.4 |
| VHSV ($hr^{-1}$) | 1400 | 570–3600 |
| $O_2:H_2S$ Ratio | 27 | 8.3–82.7 |
| Duration of run (hours) | 1055 | |

TABLE 4

Average Operating Conditions

| Parameter | Six Inch Reactor | |
|---|---|---|
| | Average | Range |
| Catalyst Weight (lb) | 2.5 | |
| Steam Rate (lb/hr) | 24.1 | 12.4–67.3 |
| Inlet $H_2S$ (ppmw) | 97.7 | 69.–115. |
| Removal (%) | 67. | 32.–97.3 |
| Pressure (PSIG) | 99. | 76.–137. |
| Temperature (°F.) | 334. | 300.–360. |
| Contact Time (sec) | 1.7 | 0.8–3.3 |
| Superficial Velocity (cm/sec) | 4.1 | 2.0–8.6 |
| WHSV ($hr^{-1}$) | 9.6 | 5.0–26.9 |
| VHSV ($hr^{-1}$) | 2200 | 1100–4700 |
| $O_2:H_2S$ Ratio | 23. | 0.–57. |
| Duration of run (hours) | 1055 | |

TABLE 5

| Hour | Inlet $H_2S$ (ppmw) | % Removal of $H_2S$ | |
|---|---|---|---|
| | | 3" | 6" |
| 3 | 81.4 | 100 | 76 |
| 22 | 83.7 | 93 | 52 |
| 47 | 82.6 | 68 | 57 |
| 75 | 71.8 | 88 | 32 |
| 95 | 76.7 | 84 | 51 |
| 119 | 68.7 | 93 | 60 |
| 143 | 77.0 | 96 | 54 |
| 164 | 75.8 | 90 | 72 |
| 242 | 104.2 | 93 | 61 |
| 261 | 100.4 | 100 | 66 |
| 1055 | 105.7 | 99 | 75 |

Although there has been described hereinabove a specific process for removing hydrogen sulfide from geothermal steam in accordance with the invention for purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A process for removing hydrogen sulfide from geothermal steam comprising the steps of:
  introducing an oxygen-containing gas into steam produced by a geothermal source, said steam comprising water vapor and hydrogen sulfide and having a temperature of at least about 300° F.; said oxygen-containing gas being introduced into said steam in an amount to provide a molar ratio of oxygen-tohydrogen sulfide in the steam and oxygen-containing gas to be at least about 10; and, contacting the steam and oxygen containing gas in a contacting stage with iron oxide supported by a carrier resistant to deterioration by said steam under conditions sufficient to remove hydrogen sulfide from said steam and oxygen containing gas.

2. The process of claim 1, wherein the steam pressure in the contacting stage is at least about 50 psi.

3. The process of claim 1, wherein the steam pressure in the contacting stage is at least about 100 psi.

4. The process of claim 1, 2 or 3, wherein the steam-resistant carrier comprises pumice.

5. The process of claim 1, 2 or 3, wherein the iron oxide comprises iron oxyhydroxide.

6. The process of claim 1, 2 or 3, wherein the iron oxide comprises iron oxyhydroxide and ferric oxide.

7. The process of claim 1, 2 or 3, wherein the oxygen-containing gas comprises air.

8. A process for reducing the hydrogen sulfide content of geothermal steam comprising the steps of:

introducing an oxygen-containing gas into steam produced by a geothermal source, said steam comprising water vapor and hydrogen sulfide and having a temperature of at least about 300° F., said oxygen-containing gas being introduced into said steam in an amount to cause a molar ratio of oxygen-to-hydrogen sulfide in the steam and oxygen-containing gas to be at least about 10;

contacting the steam and oxygen containing gas in a contacting stage with iron oxide supported on a carrier resistant to deterioration by said steam under conditions sufficient to reduce the hydrogen sulfide content of said steam and oxygen-containing gas; and, withdrawing steam from the contacting stage, having a lower hydrogen sulfide content than the steam and oxygen-containing gas contacted with said iron oxide in the contacting stage.

9. The process of claim 8, wherein the steam pressure in the contacting stage is at least about 50 psi.

10. The process of claim 8, wherein the steam pressure in the contacting stage is at least 100 psi.

11. The process of claim 9 or 10, wherein the steam-resistant carrier comprises pumice.

12. The process of claim 9 or 10, wherein the steam-resistant carrier comprises alumina.

13. The process of claim 9 or 10, wherein the iron oxide comprises iron oxyhydroxide.

14. The process of claim 9 or 10, wherein the iron oxide comprises iron oxyhydroxide and ferric oxide.

15. The process of claim 9 or 10, wherein the oxygen-containing gas comprises air.

16. A process for reducing the hydrogen sulfide content of geothermal steam comprising the steps of:

introducing air into steam produced by a geothermal source, said steam comprising water vapor and hydrogen sulfide and having a temperature of at least about 300° F. and a pressure of at least about 100 psi, said air being introduced into said steam in an amount to provide a molar ratio of oxygen to hydrogen sulfide in the steam and air to be at least about 10;

contacting the steam and air in a contacting stage with iron oxyhydroxide at conditions sufficient to reduce the hydrogen sulfide content of said steam and air, said iron oxyhydroxide being supported on pumice; and, withdrawing steam and air, from the contacting stage, having a lower hydrogen sulfide content than the steam and air contacted with said iron oxyhydroxide in the contacting stage.

17. A process for reducing the hydrogen sulfide content of geothermal steam comprising the steps of:

introducing air into steam produced by a geothermal source, said steam comprising water vapor and hydrogen sulfide and having a temperature of at least about 300° F. and a pressure of at least about 100 psi, said air being introduced into said steam in an amount to provide a molar ratio of oxygen to hydrogen sulfide in the steam and air to be at least about 10;

contacting the steam and air in a contacting stage with iron oxyhydroxide under conditions sufficient to reduce the hydrogen sulfide content of said steam and air, said iron oxide being supported on pumice;

withdrawing steam from the contacting stage, having a lower hydrogen sulfide content than the steam and air contacted with said iron oxyhydroxide in the contacting state; and, releasing the withdrawn steam and air into the atmosphere.

* * * * *